Jan. 23, 1968 R. F. LACEY 3,364,964
SEVERING APPARATUS
Filed Nov. 1, 1965 2 Sheets-Sheet 1
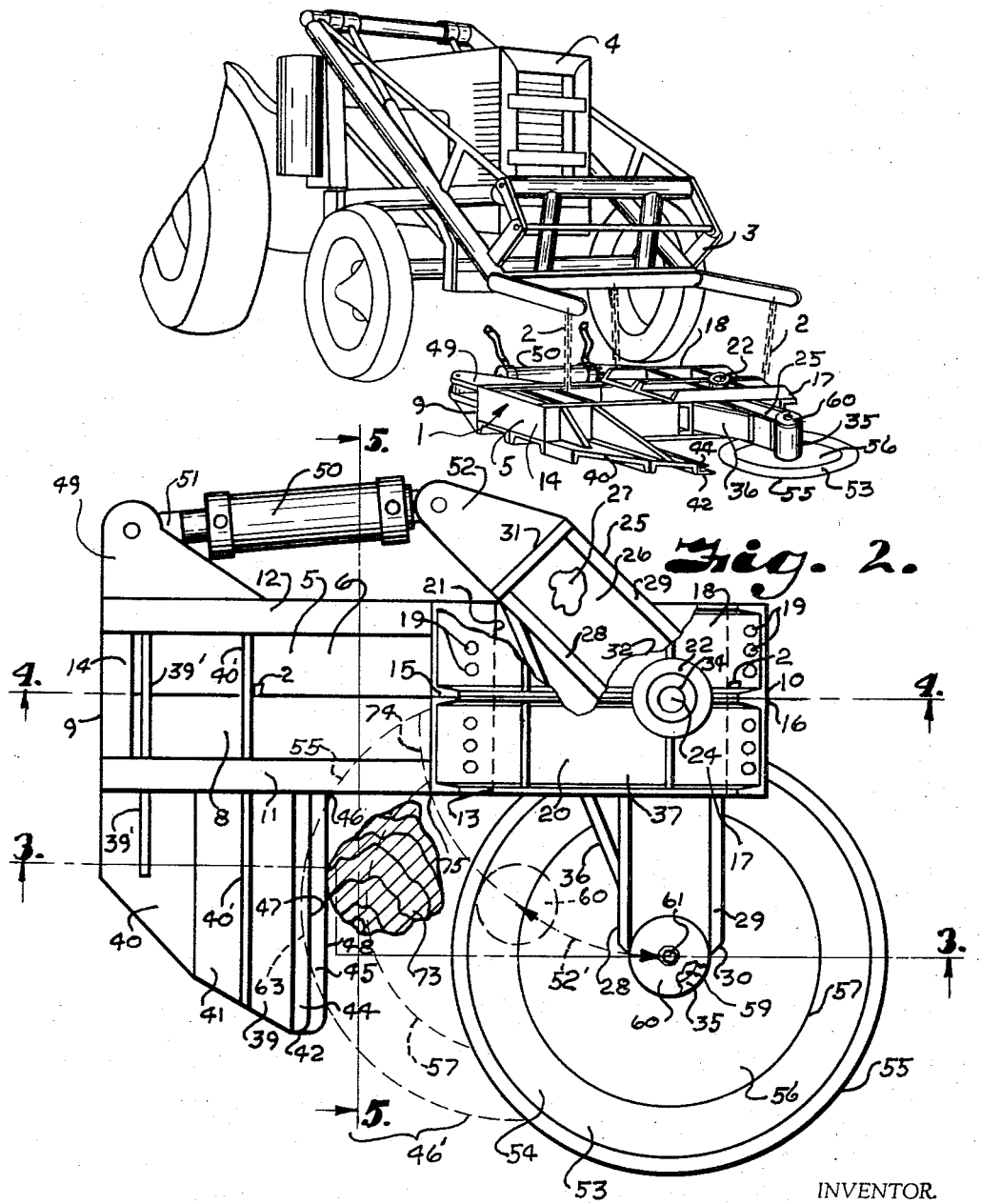
INVENTOR.
ROBERT F. LACEY
BY
Fishburn and Gold
ATTORNEYS

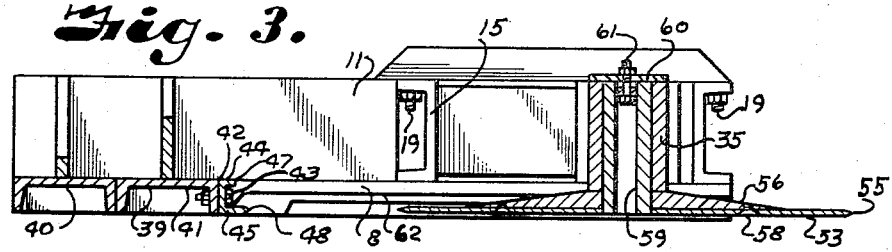
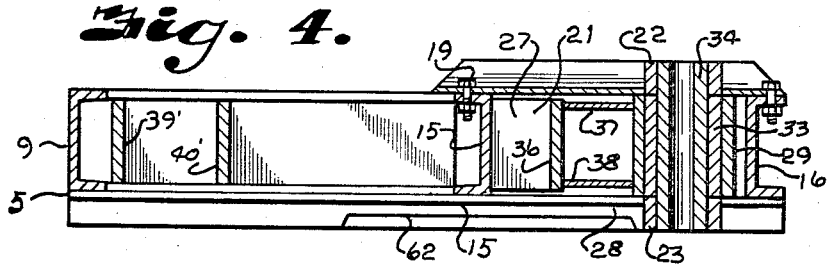
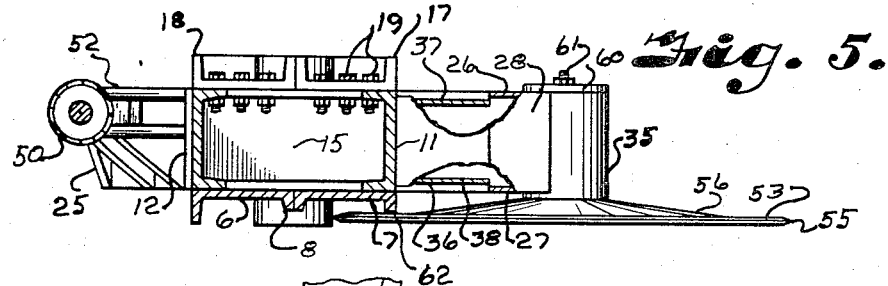
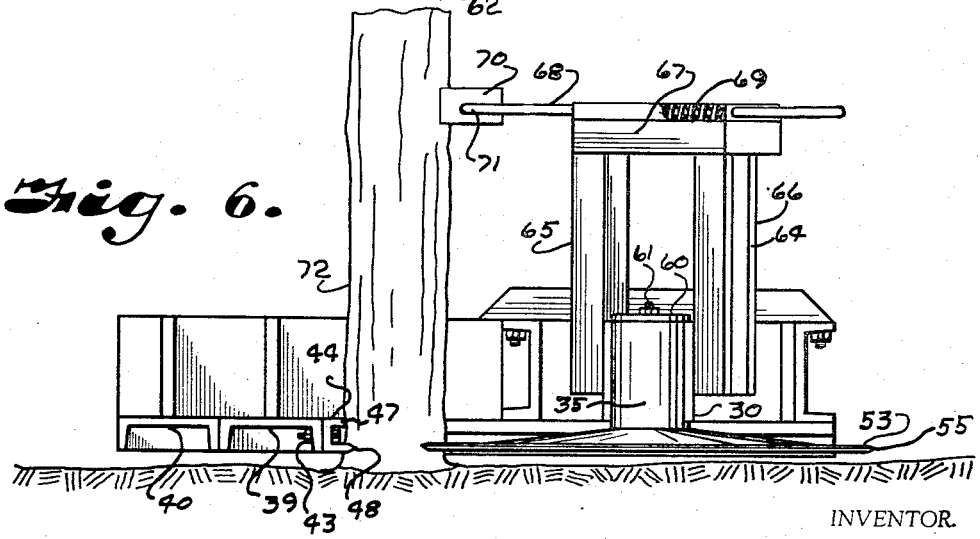

United States Patent Office 3,364,964
Patented Jan. 23, 1968

3,364,964
SEVERING APPARATUS
Robert F. Lacey, Clinton, Mo.; by court decree assignor to Lela B. Lacey, widow of Robert F. Lacey, deceased
Filed Nov. 1, 1965, Ser. No. 505,855
10 Claims. (Cl. 144—34)

ABSTRACT OF THE DISCLOSURE

Apparatus for cutting trees, logs, and similar elongate objects, said apparatus having a rigid body with portions in angular relation for the normally open entrance for movement of objects to be cut into engagement therewith. A blade is rotatably mounted on an arm that is pivotally mounted on the body for swinging about an axis parallel to and spaced from the axis of rotation of the blade whereby the blade travels in an arc to move transversely through an object within the angle of the receiving portion of the body. The blade member in the form of a circular disc has its axis in its travel whereby it intersects the body at a point spaced from the center of the object receiving portion whereby the blade rotates as it enters the object. When cutting trees the arm includes an upstanding push member resiliently urged against a tree being cut to urge same to fall in a predetermined direction.

---

The principal objects of the present invention are: to provide a device for conveniently and quickly severing trees and the like adjacent the ground; to provide such a device which may be carried by a conventional farm tractor and operated by remote control from the tractor seat; to provide such a device which functions in full view of the operator; to provide such a device which does not place undue strain upon the tractor or supports during operation; to provide such a device which is of small size for the results obtained and permits rapid land clearing without exposing roots, debris or mounds of loose earth; to provide such a device which does not require high speed cutting teeth and related apparatus; to provide such a device which urges the tree in a desired direction during the cut so that it will fall away from the tractor and into a position for ease of subsequent clearing; to provide such cutting apparatus which also may be used for dividing horizontal tree trunks and the like if desired; to provide such apparatus having a free rotatable circular blade which is adapted to roll as it cuts to produce a slicing effect which reduces the force required to urge the blade through the material; and to provide such apparatus which is relatively simple and inexpensive in construction and highly versatile and long-lived in use.

Other objects and advantages of this invention will become apparent from the following description taken in connection with the accompanying drawings wherein are set forth by way of illustration and example certain embodiments of this invention.

FIG. 1 is a perspective view showing a farm tractor equipped with conventional high loading arms to which cutting apparatus embodying this invention is attached by means of chains.

FIG. 2 is a plan view of the cutting apparatus shown in tree receiving position with a portion broken away to show details of the blade supporting arm.

FIG. 3 is a vertical cross-sectional view through the cutting apparatus taken on the line 3—3, FIG. 2, particularly showing the severing blade structure and bumper for engaging the trunk of a tree.

FIG. 4 is a vertical cross-sectional view through the apparatus taken on the line 4—4, FIG. 2, particularly showing the configuration of the body or channel structure and the pivotal support of the blade arm.

FIG. 5 is a vertical cross-sectional view through the cutting apparatus taken on line 5—5, FIG. 2, further showing the configuration of the body or channel structure.

FIG. 6 is a front elevation of a modified form of apparatus embodying this invention having a spring loaded arm member projecting thereabove to aid in urging a tree to fall in the desired direction during severing.

Referring to the drawings in more detail:

The reference numeral 1 generally indicates cutting or severing apparatus embodying this invention. The apparatus 1 is shown suspended by chains 2 from loader arms 3 mounted on a conventional farm tractor 4 having conventional hydraulic members (not shown) for operating hydraulically actuated equipment. The apparatus 1 is normally carried in a horizontal plane near the ground and in full view of the tractor operator.

The apparatus 1 is comprised of a rigid horizontally extending elongated body or channel structure 5 which includes bottom channels 6 and 7 forming an elongated bottom plate 8. The bottom plate 8 has first and second opposed spaced apart ends 9 and 10 which preferably are positioned in a line extending transversely of the tractor 4. A pair of side channels 11 and 12 extend parallel to and upwardly from the bottom plate 8 in spaced apart relation with the legs thereof opposed and pointing toward each other. The side channels 11 and 12 extend along the bottom plate 8 from the first end 9 to a position 13 intermediate the plate ends 9 and 10. The structural members of the apparatus 1 are preferably welded together unless otherwise noted.

A first transverse end plate channel 14 extends upwardly from the bottom plate 8 between the side channels 11 and 12 at the first end 9. An intermediate transverse channel 15 extends upwardly from the bottom plate 8 at the intermediate position 13 and parallel to the channel 14. A second transverse end channel 16 extends upwardly from the bottom plate 8 at the plate second end 10 and is spaced from the intermediate channel 13 but extends parallel thereto.

The channel structure 5 includes top channels 17 and 18 extending in side-by-side relation parallel to and spaced upwardly from the bottom plate 8 between the intermediate transverse channel 15 and the second transverse end channel 16. The top channels 17 and 18 are removably rigidly secured to the upper legs of the channels 15 and 16 by suitable bolts 19 and together form a top plate 20. The top and bottom plates 20 and 8 and the transverse channels 15 and 16 form a rectangular passageway 21 extending transversely through the channel structure 5 and open adjacent the side channels 11 and 12. Vertically aligned bearings 22 and 23 are respectively received and rigidly retained in spaced apart relation in said top and bottom plates 20 and 8 and have a common axis 24 extending vertically through the passageway 21.

An elongated rigid arm 25 has an upper plate portion 26 and a lower plate portion 27 and side wall portions 28 and 29. The arm has front and rear end portions 30 and 31 respectively and an intermediate portion 32 therebetween. The arm 25 extends transversely of the channel structure 5 through the passageway 21 and the front and rear end portions 30 and 31 respectively project laterally outwardly of the side channels 11 and 12. The arm 25 is of lesser cross-sectional width than the passageway 21 and has a first vertically extending hollow hub 33 rigidly secured thereto at the intermediate portion 32 and proportioned for axial alignment between the plate bearings 22 and 23. A pin 34 extends through the plate bearings 22 and 23 and the hub 33 whereby the arm 25 is pivotally mounted for horizontal reciprocal motion with respect to the channel structure 5. A second vertically extending hub 35 of hollow configuration is rigidly secured to the arm 25 at the front end portion 30 for reasons noted below.

The arm 25 is bent at the intermediate portion 32 whereby the rear end portion 31 angles in the direction of the first transverse end channel 14 when the front end portion 30 extends generally perpendicular normal to the channel structure 5. A strengthening gusset 36 is secured to the arm side wall 28 and extends generally between the arm front and rear end portions 30 and 31. The gusset 36 is primarily positioned within the passageway 21. Upper and lower plates 37 and 38 fill the space between the side wall 28 and gusset 36 and add further rigidity to the arm 25.

A pair of rigid channels 39 and 40 form a foot member or bumper 41 secured to the channel structure 5 adjacent the first transverse end channel 14. The bumper 41 projects horizontally outwardly from the side channel 11 generally in the direction of the arm front end portion 30 and at the level of the bottom plate 8 forming a partially enclosing corner configuration described below. Parallel strengthening bars 39' and 40' project upwardly from the bumper 41 and the bottom channels 6 and 7. The bumper 41 has a horizontally extending edge channel 42 secured thereto by means of suitable bolts 43, the channel extending horizontally or normally to the channel structure 5. The edge channel 42 has upper and lower legs 44 and 45 respectively pointed toward the arm front end portion 30 and are spaced therefrom toward the first end 9 of the channel structure. The edge channel 42 forms with the side channel 11 a vertically and laterally open tree receiving and engaging portion in the form of an inside or interior corner 46. The corner 46 preferably but not necessarily produces a 90-degree angle but, if desired, may be rounded or take some other suitable configuration which will trap a tree trunk therein upon apparatus operation. The upper leg 42 has a dull edge 47 and is spaced a greater distance from the arm front end portion 30 than the lower leg 45. The lower leg 45 is beveled on the upper and lower surface thereof forming a relatively sharp edge 48.

A rigid support or anchor member 49 is secured to the channel structure 5 adjacent the first transverse end channel 14 and extends outwardly in a direction opposed to the bumper 41. An extensible hydraulic cylinder 50, for example, of the type adapted to exert a 10-ton thrust, has one end 51 thereof pivotally secured to the support member 49 and the other end thereof pivotally secured to the arm rear end portion 31 by means of a suitable clevis 52. Upon extension and contraction of the cylinder 50, the arm front end portion 30 is reciprocally urged in an arc indicated by the broken lines 52' toward and away from the inside corner 46. As noted below, the arm 25 is proportioned and mounted so that the arc 52', if extended, would fall short of the corner 46.

A cutter disc 53 comprises a horizontal circular blade 54 having a sharpened peripheral edge 55 formed by beveling on the upper and lower surfaces thereof. A shallow conical plate 56 is fixed coaxially with the disc 53 on the upper surface thereof and has a peripheral sharpened edge 57 with a diameter of about two-thirds the diameter of the disc 53 and engaging the upper surface of the disc. The disc 53 and conical plate 56 are joined together by means of suitable screws 58 whereby the disc may be removed and replaced when desired. A vertical shaft 59 is rotatably mounted in the second vertically extending hub 35 and retained against downward motion with respect thereto by means of a retainer plate 60 maintained in place by a suspending bolt 61. The shaft 59 extends downwardly past the bottom of the hub 35 and is rigidly secured coaxially with the conical plate 56, for example, by welding.

The disc edge 55 is located in a plane which extends between the edge channel legs 44 and 45 whereupon the disc edge may be received between the edge channel legs upon the extension of the hydraulic cylinder 50, as noted below. The configurations of the arm, channel structure and foot member are such that upon reciprocation of the arm, the hub 35 and, therefore, the disc edge 55, reciprocate horizontally into and out of the laterally horizontally open part or entrance 46' to the inside corner 46. The bottom channels 6 and 7 have suitable downwardly open recesses 62 cut into the downwardly depending legs thereof for receiving the disc edge 55 therebeneath upon the extension of the cylinder 50. Thus, relief is provided to permit the disc edge 55 to substantially completely eclipse or fill the inside corner 46 upon arm reciprocation. When the inside corner 46 is eclipsed, a portion of the disc indicated by the broken lines 63 extends between the upper and lower legs 44 and 45.

Referring to FIG. 6, a modified form of this invention is illustrated which is similar in all respects to the above-described embodiment, and has received the same reference numerals for like parts, but includes in addition an arm member 64 secured to the arm 25 adjacent the front end 30 so as to move with the arm end 30. The member 64 has upstanding legs 65 and 66 supporting an upper platform 67 which slidably receives a rod 68 therethrough. The platform 67 supports a helical compression spring 69 which urges the rod 68 generally toward the front end 9 of the channel structure. A pusher member 70 is secured to a free end 71 of the rod 68 and is positioned to engage a tree 72 or the like approximately simultaneously with the disc 53 to urge the tree toward a desired direction of fall as the disc slices through the tree.

In operation, the apparatus 1 is carried by the tractor, illustrated in FIG. 1, and directed toward a tree with the cylinder 50 retracted. Referring to FIG. 2, the apparatus is positioned so that a tree 73 enters between the corner 46 and the edge 55 of the disc 53. The apparatus is normally allowed to drop so that it rests upon the ground which positions the disc 53 only an inch or less from the top of the ground. Because the chains 2 thus become slack, a resultant movement by the apparatus during severing does not normally place a strain on the tractor arms or the tractor. The cylinder 50 is then extended causing the edge 55 of the disc 53 to bite into the tree 73 approximately at ground level. The sharpened lower leg 45 of the edge channel 42 bites into the tree at a position opposed from the disc 53, but the leg 45 is limited in depth of entry by contact of the tree by the dull upper leg 44.

As the cylinder 50 extends, the disc 53 is urged through the tree; however, due to the apparatus configuration, a slicing and rolling effect is created which substantially reduces the force needed to accomplish this. The slicing and rolling effect is caused by rotation of the disc 53 in the hub 35 resulting from a component of force which is created by displacement of the disc axis path of travel away from the inside corner 46. By way of explanation, if the arc 52' were extended, it would take a path indicated by the broken lines 74 which intersects the side channel 11 at 75 rather than at the corner 46. This causes the disc 53 to move counterclockwise, as illustrated in FIG. 2, as the edge 55 is urged through the tree 73. When the corner 46 has been eclipsed by the edge 55, a portion 63 of the edge, as noted above, has passed over the sharpened lower leg 45 producing a scissors action which completes the cut. Since the vertical displacement between the disc 53 and the sharpened lower leg 45 is small, although large forces are involved, there is very little tendency to produce a reaction which will twist the disc 53 or move the apparatus 1 out of parallel relationship with the ground.

In the event that the forces are such that the upper or dull leg 44 contacts the trunk of the tree, the force path of the edge 55 then extends between the upper and lower legs 44 and 45 and twisting moment is further reduced. When the conical plate 56 is urged into the cut, upper and lower portions of the tree tend to spread apart and urge the tree away from the place of blade entry and thereby urge the tree to fall in a direction to the right front of the tractor. No significant twisting moment is produced by the entry of the conical plate 56 since the major forces exerted will be balanced through compression between the bottom of the disc 53 and the top of the conical plate 56.

In the embodiment of FIG. 6, the member 70 urged by the spring 69, reinforces the force produced by the conical plate 56 to push the severed tree in the desired direction as the cut progresses.

It is to be understood that the apparatus of FIG. 1 may be supported in any suitable manner and that while it is illustrated as cutting in a substantially horizontal position, it is contemplated that it may be turned to a vertical position for cutting of tree trunks, limbs and the like. In other words, after a tree has been cut and felled, the apparatus may be turned to a vertical position and moved along the tree trunk and limbs to cut and split same as desired into fireplace or stove lengths.

It is to be further understood that although certain forms of this invention have been illustrated and described, it is not to be limited thereto except insofar as such limitations are included in the claims.

What is claimed and desired to secure by Letters Patent is:

1. Apparatus for severing trees, logs, and similar objects comprising:
   (a) a rigid body having structural members projecting in angular relation into partially enclosing configuration forming an open object receiving and engaging portion having a normally open entrance,
   (b) an arm, pivotal means on said body and spaced from said receiving and engaging portion, said means pivotally mounting said arm on said body for movement toward said receiving and engaging portion, said arm having a support member fixed thereon and positioned to reciprocate toward and away from said entrance upon pivotal reciprocation of said arm with respect to said body,
   (c) a blade member mounted on said support member and having a sharp edge projecting toward said receiving and engaging portion, said blade member being located in a plane normal to the axis of pivotal movement of the arm and substantially coincident with said receiving and engaging portion and at least partially closing said entrance and eclipsing said receiving and engaging portion progressively upon the reciprocation of said support member toward said entrance,
   (d) force exerting means connected between said body and said arm for selectively reciprocating said arm to open said entrance for receiving an elongate object to be cut in said receiving and engaging portion and subsequently urging said blade edge through the object,
   (e) said support member pivotally mounting said blade member on the arm for free rotation about an axis parallel to and spaced from the axis of pivotal movement of said arm.

2. The apparatus as set forth in claim 1 wherein:
   (a) said blade member is a circular disc,
   (b) said disc is mounted on said support member for free rotation about the axis of said disc,
   (c) said support member is located with respect to said body so that the arc of travel of said axis intersects said body at a point displaced from the center of said receiving and engaging portion, and
   (d) whereby a moment is created causing said disc to rotate as it is forced through the object to be cut.

3. The apparatus as set forth in claim 1 wherein:
   (a) said force exerting means connected between said body and said arm is an extensible hydraulic cylinder.

4. The apparatus as set forth in claim 2 wherein:
   (a) said structural members are shaped and positioned whereby said partially enclosing configuration includes an inside corner, and
   (b) said arm and body are proportioned whereby the axis of said cutter disc travels in an arc displaced from said inside corner to induce rotation of said disc upon cutting through an object located between said corner and said disc.

5. The apparatus as set forth in claim 2 wherein:
   (a) one of said structural members has an edge channel therealong,
   (b) said edge channel having upper and lower legs pointed toward said blade support member and spaced therefrom, and
   (c) the plane containing said disc edge extends between said edge channel legs.

6. The apparatus as set forth in claim 5 wherein:
   (a) said edge channel upper leg has a dull edge and is spaced a greater distance from said blade support portion than said lower leg, and
   (b) said lower leg is beveled forming a sharp edge facing said blade support portion.

7. The apparatus as set forth in claim 2 wherein:
   (a) said disc is beveled on the upper and lower surfaces thereof forming said sharpened peripheral edge.

8. The apparatus as set forth in claim 2 including:
   (a) a conical plate fixed on the surface of said disc and coaxial thereto,
   (b) said conical plate having a peripheral sharpened edge engaging said surface of said disc,
   (c) said conical plate being adapted to spread the cut produced by said disc for urging a tree being cut to fall in a predetermined direction.

9. The apparatus as set forth in claim 2 including:
   (a) an upwardly extending support member secured to said disc support member,
   (b) a push member movably mounted in said last named support member at a position spaced above said body structure,
   (c) resilient means engaged between said push member and said support member and adapted to resiliently urge said push member generally in the direction of movement of said disc during cutting,
   (d) said push member being positioned to resiliently engage a tree received in said receiving and engaging portion to urge same to fall in a predetermined direction.

10. The apparatus as set forth in claim 1 wherein:
    (a) said pivotal means on said body includes vertically aligned bearings, and
    (b) said arm has a transverse pin extending therethrough and engaging said bearings.

References Cited
UNITED STATES PATENTS

| | | | |
|---|---|---|---|
| 2,493,696 | 1/1950 | Porstada. | |
| 3,122,184 | 2/1964 | Larson | 144—34 |
| 3,270,787 | 9/1966 | Rehnstrom | 144—34 |

WILLIAM W. DYER, JR., *Primary Examiner.*

W. D. BRAY, *Assistant Examiner.*